United States Patent
Ishihara

(10) Patent No.: US 6,623,145 B2
(45) Date of Patent: Sep. 23, 2003

(54) LIGHT SOURCE DEVICE

(75) Inventor: Takeshi Ishihara, Tokyo (JP)

(73) Assignee: NEC Microwave Tube, Ltd., Kanagawa (JP)

( * ) Notice: Subject to any disclaimer, the term of this patent is extended or adjusted under 35 U.S.C. 154(b) by 0 days.

(21) Appl. No.: 09/924,474

(22) Filed: Aug. 9, 2001

(65) Prior Publication Data

US 2002/0021508 A1 Feb. 21, 2002

(30) Foreign Application Priority Data

Aug. 10, 2000 (JP) ........................................ 2000-242999

(51) Int. Cl.[7] .............................. F21V 7/00; F21V 7/06; F21V 7/09; H01J 5/16; H01K 1/30
(52) U.S. Cl. ....................... 362/346; 362/347; 362/350; 313/110; 313/323; 313/493
(58) Field of Search ................................. 313/493, 110; 362/327, 328, 329, 346, 347, 348, 350

(56) References Cited

U.S. PATENT DOCUMENTS

| 4,769,748 A | * | 9/1988 | Levin et al. ................. 362/214 |
| 4,897,771 A | * | 1/1990 | Parker ......................... 362/298 |
| 5,414,600 A | * | 5/1995 | Strobl et al. ................. 362/551 |
| 5,509,095 A | * | 4/1996 | Baker et al. ................. 385/31 |
| 6,356,700 B1 | * | 3/2002 | Strobl ......................... 385/147 |

FOREIGN PATENT DOCUMENTS

| JP | 53-126927 | | 11/1978 |
| JP | 5-313005 | | 11/1993 |
| JP | A 9-297354 | | 11/1997 |
| JP | A 11-149901 | | 6/1999 |
| JP | 2000-138005 A | * | 5/2000 |

* cited by examiner

Primary Examiner—John Juba
(74) Attorney, Agent, or Firm—Young & Thompson

(57) ABSTRACT

A light source device includes a discharge lamp having a tubular transparent bulb with sealed opposite ends for generating discharged light near a light emission center thereof, and a reflecting mirror having a reflecting surface which has a curved surface approximating a paraboloid whose focal point is positioned at the light emission center of the transparent bulb. The reflecting surface is divided by a boundary into a first curved surface extending from the boundary toward a closed end of the reflecting mirror and a second curved surface extending from the boundary toward an open end of the reflecting mirror. The first curved surface is shaped such that the angle of incidence of a ray of light emitted from the light emission center and applied to the first curved surface is progressively smaller toward the closed end, and changes of the angle of incidence are greater than changes of the angle of incidence of a ray of light on the paraboloid.

10 Claims, 11 Drawing Sheets

LIST OF MATERIALS FOR TRANSPARENT BULB AND REFRACTIVE INDEX THEREOF

| MATERIALS | CHEMICAL SYMBOL | REFRACTIVE INDEX |
|---|---|---|
| QUARTS (SYNTHETIC OR FUSED) | $SiO_2$ | 1.46 (546nm) |
| YAG | $Nd^{3+} : Y_3Al_5O_{12}$ | 1.8 (AVERAGE OF VISIBLE RADIATION) |
| LIGHT-TRANSMISSIVE ALUMINA | $\alpha - Al_2O_3$ | 1.76 (AVERAGE OF VISIBLE RADIATION) |

LIGHT SOURCE DEVICE

BACKGROUND OF THE INVENTION

(1) Field of the Invention

The present invention relates to a light source device for use in a projection-type display apparatus such as a liquid crystal projector or the like, and more particularly to an illuminating apparatus and projection-type display apparatus which employ such a light source device.

(2) Description of the Prior Art

Light source devices for use in projection-type display apparatus have a light source comprising a discharge lamp such as a xenon lamp which is of high luminance and high emission efficiency, a high-pressure mercury lamp, or a metal halide lamp, and a reflecting mirror for reflecting rays of light radiated from the light source into a parallel beam of light. FIG. 1 of accompanying drawings is a fragmentary cross-sectional view of a conventional light source device.

As shown in FIG. 1, the conventional light source device comprises discharge lamp 100 having a filling material capable of maintaining discharged light emission and a pair of electrodes 102a, 102b which are sealed in tubular transparent bulb 103 of quartz or the like that is of a substantially uniform thickness, and reflecting mirror 101 having paraboloid 101a as a reflecting surface whose focal point is positioned at light emission center 100a of discharge lamp 100. Rays of light radiated from light emission center 100a of discharge lamp 100 are reflected by paraboloid 101a of reflecting mirror 101, and travel substantially parallel to the axis (optical axis f) of paraboloid 101a.

The effective range in which the rays of light that are emitted from light emission center 100a of discharge lamp 100 can be used is defined between a ray "a" of light (inclined at angle θ1 to optical axis f) falling on paraboloid 101a and ray "b" of light (inclined at angle θ2 to optical axis f) falling on paraboloid 101a. FIG. 2 of the accompanying drawings shows a discharge lamp which is designed to increase the above effective range for an increased effective ray availability ratio (the ratio of rays of reflected light that can be used to all the rays of light emitted from the discharge lamp. The discharge lamp shown in FIG. 2 is basically of the same structure as the discharge lamp shown in FIG. 1 except that transparent bulb 103 has a lens structure. Specifically, transparent bulb 103 shown in FIG. 2 has wall thickness D1 at its center which is greater than wall thickness D2 at a sealed end thereof, enabling transparent bulb 103 to produce a lens effect. FIG. 2 also shows the rays "a", "b" of light shown in FIG. 1 which are indicated by solid lines. The lens effect of transparent bulb 103 causes rays "d", "c" of light emitted outside of the range between the rays "a", "b" of light in the discharge space of the transparent bulb 103 to fall on paraboloid 101a of reflecting mirror 101. Therefore, the effective ray availability ratio of the light source shown in FIG. 2 is better than the effective ray availability ratio of the light source shown in FIG. 1.

However, since the transparent bulb having the lens effect refracts the rays of light emitted therefrom, the focal point of paraboloid 101a is shifted out of alignment with light emission center 100a, failing to produce parallel rays of light reflected from reflecting mirror 101. Details of such a phenomenon are illustrated in FIG. 3 of the accompanying drawings. As shown in FIG. 3, paraboloid 101a is divided into regions I, II by a boundary where ray "i" of light emitted from light emission center 100a and passing, unrefracted, through transparent bulb 103 is applied to paraboloid 101a. Region I extends from the boundary toward the closed end or crest of reflecting mirror 101, whereas region II extends from the boundary toward the open end of reflecting mirror 101. Ray "i" of light is reflected by paraboloid 101a and travels parallel to optical axis f. However, rays "h", "g" of light reflected by region I and rays "k", "j" of light reflected by region II do not travel parallel to optical axis f. That is, rays "h", "g" of light reflected by region I spread at respective angles away from optical axis f, and rays "k", "j" of light reflected by region II are intersected at respective angles toward optical axis f.

Therefore, the conventional attempt to increase the effective ray availability ratio of the light source with the lens structure of the transparent bulb has reduced the parallelism of the rays of light reflected by the reflecting mirror with the optical axis f.

Japanese laid-open patent publication No. 2000-138005 has proposed a transparent bulb that can easily be controlled in shape at the time it is fabricated, the transparent bulb having an outer wall shaped to produce parallel rays of light. However, changing the shape of the outer surface of the transparent bulb as a condensing lens poses a limitation on the correction of parallelism of the reflected rays of light.

SUMMARY OF THE INVENTION

A first object of the present invention is to provide a light source device which is of high luminance and is capable of emitting rays of light in high parallelism.

A second object of the present invention is to provide an illuminating apparatus which is of high luminance and is capable of emitting rays of light in high parallelism, using such a light source device.

A third object of the present invention is to provide a projection-type display apparatus which is of high luminance and is capable of emitting rays of light in high parallelism, using such a light source device.

To achieve the first object, a light source device according to the present invention includes a discharge lamp having a tubular transparent bulb with sealed opposite ends for generating discharged light emission near a light emission center thereof, and a reflecting mirror having a reflecting surface which comprises a curved surface approximating a paraboloid whose focal point is positioned at the light emission center of the transparent bulb, the transparent bulb having a lens structure whose wall thickness is greater at the light emission center thereof than at the sealed ends thereof, the reflecting surface being divided by a boundary where a ray of light emitted from the light emission center and passing, unrefracted, through the transparent bulb is applied to the reflecting surface, into a first curved surface extending from the boundary toward an open end of the reflecting mirror and a second curved surface extending from the boundary toward a closed end of the reflecting mirror, which is remote from the open end, the second curved surface being shaped such that the angle of incidence of a ray of light emitted from the light emission center and applied to the second curved surface is progressively smaller toward the closed end, and changes of the angle of incidence are greater than changes of the angle of incidence of a ray of light on the paraboloid.

The first curved surface may be arranged such that the angle of incidence of a ray of light emitted from the light emission center and applied to the first curved surface is progressively greater in a direction away from the boundary, and changes of the angle of incidence are greater than changes of the angle of incidence of a ray of light on the paraboloid.

To achieve the second object, an illuminating apparatus according to the present invention includes the above light source device and a condensing optical system for converging rays of light emitted from the light source device to produce uniform illuminating light.

To achieve the third object, a projection-type display apparatus according to the present invention includes the above light source device and projection image generating means for partly passing light emitted from the light source device to generate a projection image.

The present invention offers the following advantages:

The angle of incidence of a ray of light refracted by and passing through the transparent bulb, and applied to the paraboloid whose focal point is positioned at the light emission center of the transparent bulb is greater near the closed end of the reflecting mirror and smaller near the open end thereof than the angle of incidence of a ray of light passing, unrefracted, through the transparent bulb. With the paraboloid used as a reflecting surface, as is conventional, the angle of incidence is varied due to the refraction of rays of light, lowering the parallelism of the rays of light with the optical axis of the reflecting mirror.

According to the present invention, the second curved surface closer to the closed end of the reflecting mirror is shaped such that the angle of incidence of a ray of light thereon is progressively smaller in a direction away from the boundary, and changes of the angle of incidence are greater than changes of the angle of incidence of a ray of light on the paraboloid. Therefore, any variations of the angle of incidence on the second curved surface due to the refraction are compensated for, and rays of light refracted by and passing through the transparent bulb are reflected by the second curved surface to travel parallel to the optical axis, i.e., the axis of the paraboloid.

Furthermore, the first curved surface closer to the open end of the reflecting mirror is shaped such that the angle of incidence of a ray of light thereon is progressively greater in a direction away from the boundary, and changes of the angle of incidence are greater than changes of the angle of incidence of a ray of light on the paraboloid. Therefore, as with the second curved surface, any variations of the angle of incidence on the first curved surface due to the refraction are compensated for, and rays of light refracted by and passing through the transparent bulb are reflected by the first curved surface to travel parallel to the optical axis, i.e., the axis of the paraboloid.

According to the present invention, the light source device is free of the conventional problem of poor parallelism of rays of light reflected by the reflecting mirror with the optical axis thereof as a result of the lens structure employed by the transparent bulb for an increased effective ray availability ratio.

The above and other objects, features, and advantages of the present invention will become apparent from the following description with reference to the accompanying drawings which illustrate examples of the present invention.

DESCRIPTION OF THE PREFERRED EMBODIMENTS

Light Source Device

Figure 4:
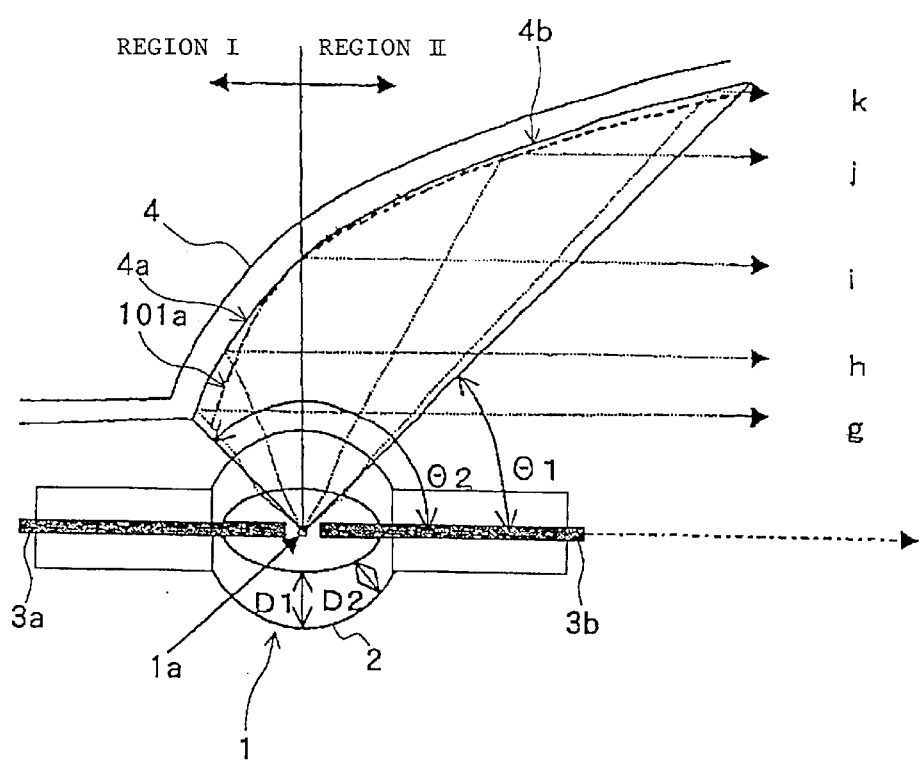
FIG. 4 is a fragmentary cross-sectional view of a light source device according to the present invention.

FIG. 4 shows in fragmentary cross section a light source device according to the present invention. As shown in FIG. 4, the light source device according to the present invention comprises discharge lamp 1 having a certain gas and a pair of electrodes 3a, 3b which are sealed in tubular transparent bulb 2 of quartz or the like, and reflecting mirror 4 for reflecting rays of light emitted from a light emission center 1a of discharge lamp 1. In FIG. 4, paraboloid 101a whose focal point is located at light emission center 1a of discharge lamp 1 is indicated by the dotted line for easy comparison between the structure of the light source device according to the present invention and the conventional structure of the light source device.

Transparent bulb 2 has outer and inner wall surfaces each represented by a spherically or elliptically curved surface, and is of a lens structure having a wall thickness D1 at the bulb center that is greater than a wall thickness D2 at a sealed end thereof. The lens structure of transparent bulb 2 refracts rays of light emitted from light emission center 1a so as to fall efficiently on the reflecting surface of reflecting mirror 4. Insofar as the emitted rays of light are radiated from transparent bulb 2 in an angular range from θ1 to θ2, the rays of light are reflected by reflecting mirror 4 and travel as parallel rays of light that are available for use.

Reflecting mirror 4 has its reflecting surface made up of different curved surfaces 4a, 4b in respective regions I, II. Regions I, II are separated from each other by a boundary where ray "i" of light emitted from light emission center 1a and passing, unrefracted, through transparent bulb 2 is applied to the reflecting surface of reflecting mirror 4. Region I extends from the boundary toward the closed end or crest of reflecting mirror 4, whereas region II extends from the boundary toward the open end of reflecting mirror 4.

Curved surface 4a in region I is shaped such that the angle of incidence of rays of light falling thereon is progressively smaller away from the boundary between regions I, II, i.e., toward the closed end of reflecting mirror 4, and that changes in the angle of incidence are greater than changes in the angle of incidence upon paraboloid 101a. Curved surface 4b in region II is shaped such that the angle of incidence of rays of light falling thereon is progressively greater away from the boundary between regions I, II, i.e., toward the open end of reflecting mirror 4, and that changes in the angle of incidence are greater than changes in the angle of incidence upon paraboloid 101a. The angle of incidence described above refers to an angle of the ray of emitted light (the ray of incident light) applied to the reflecting surface with respect to the normal to the spot where the ray of emitting light is applied.

The relationship between the angles of incidence of rays of emitted light on reflecting mirror 4 of the light source device according to the present invention and the angles of incidence of rays of emitted light on paraboloid 101a will be described in specific detail below.

Figure 5:
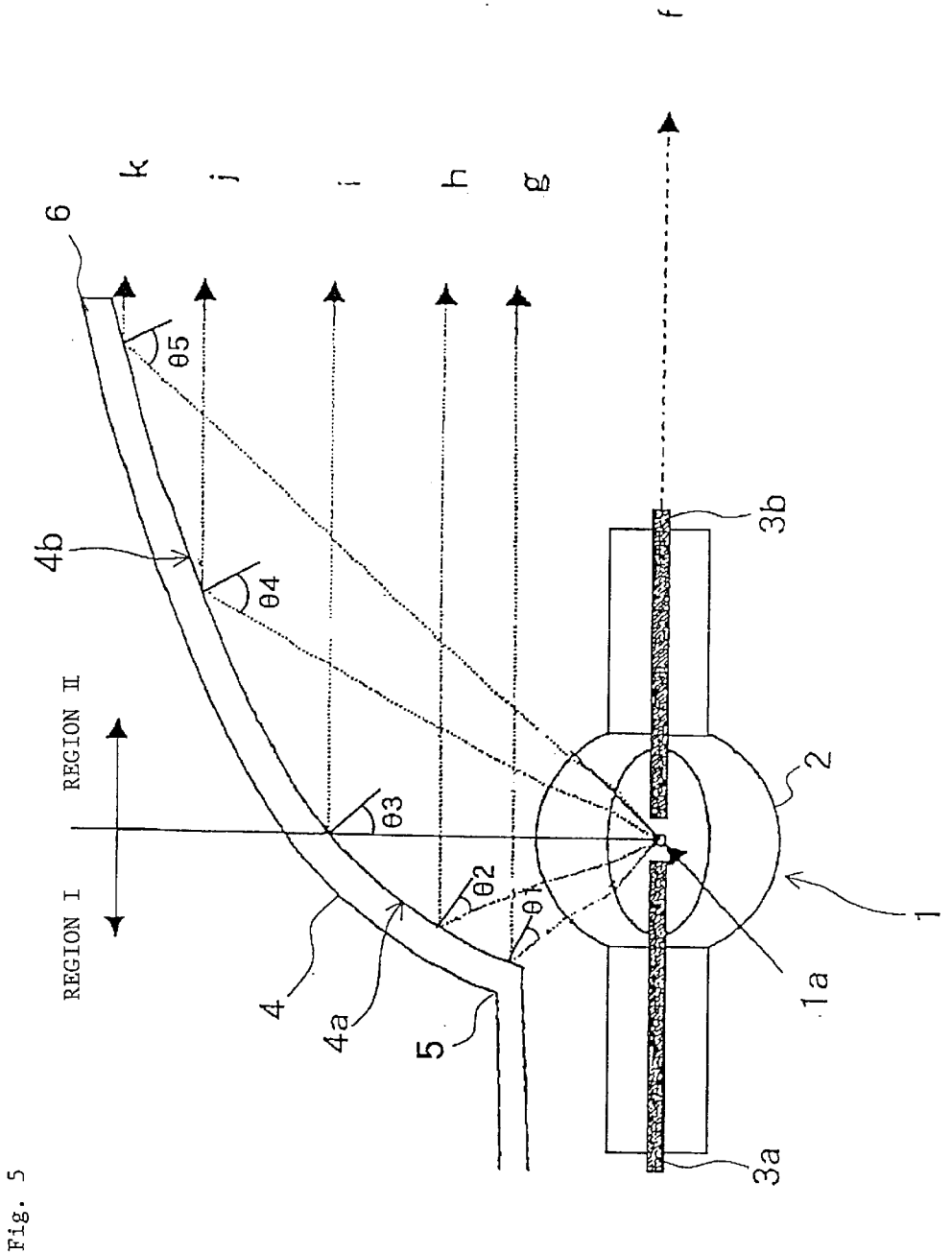
FIG. 5 is a cross-sectional view showing different angles of incidence of rays of light upon a reflecting mirror of the light source device shown in FIG. 4.
Figure 6:
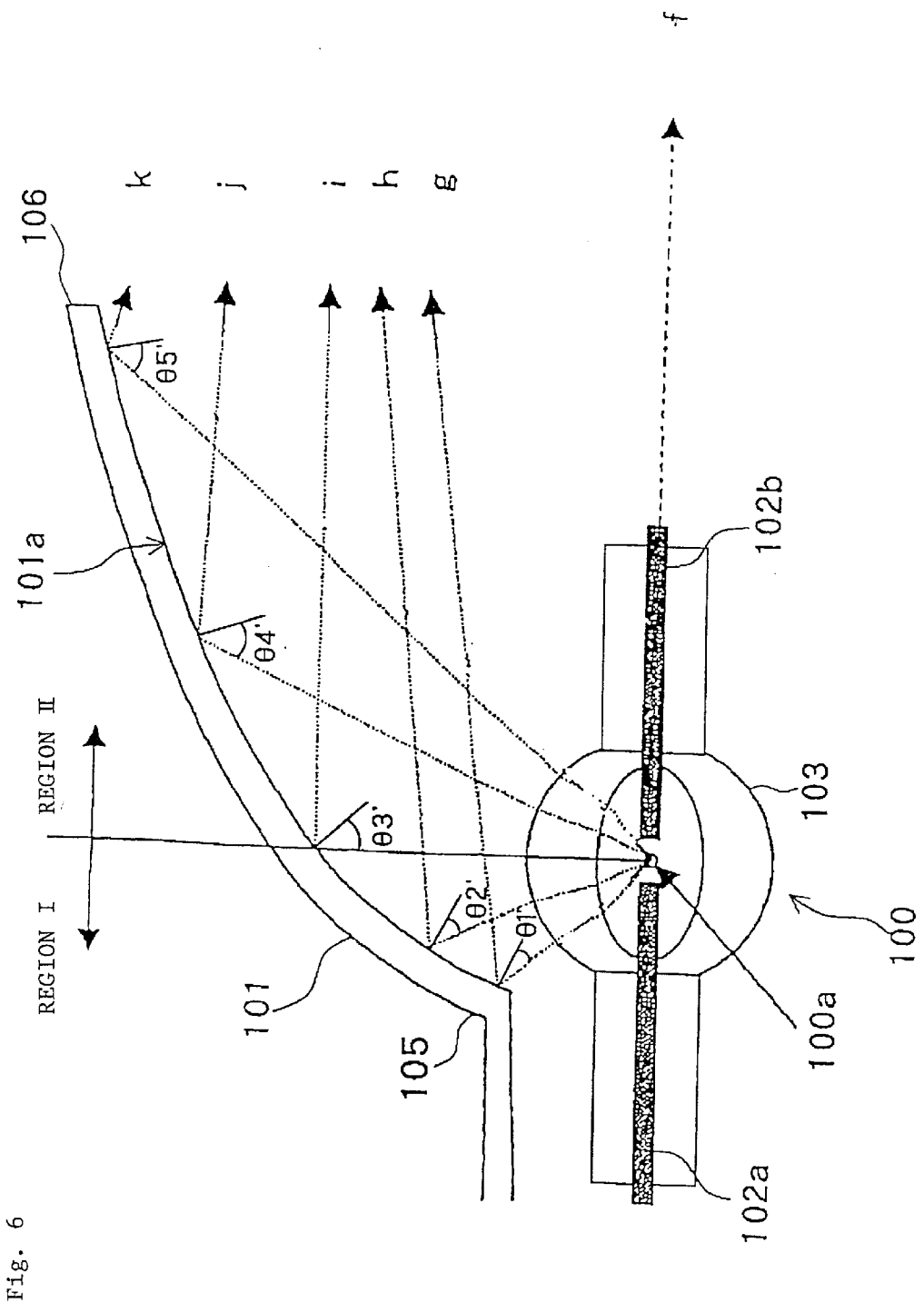
FIG. 6 is a cross-sectional view showing different angles of incidence of rays of light upon a paraboloid.

FIG. 5 shows different angles of incidence of rays of emitted light on curved surfaces 4a, 4b of reflecting mirror 4, and FIG. 6 shows different angles of incidence of rays of emitted light on paraboloid 101a. Rays "g" through "k" of light in FIG. 5 correspond respectively to rays "g" through "k" of light in FIG. 6.

As shown in FIG. 5, the angle of incidence of the ray of emitted light on curved surface 4a in region I of reflecting mirror 4 of the light source device according to the present invention is progressively smaller toward closed end 5 of reflecting mirror 4 ($\theta 1 < \theta 2 < \theta 3$), and the angle of incidence of the ray of emitted light on curved surface 4b in region II of reflecting mirror 4 is progressively greater toward open end 6 of reflecting mirror 4 ($\theta 3 < \theta 4 < \theta 5$). Similarly, the angle of incidence of the ray of emitted light on curved surface in region I of paraboloid 101a shown in FIG. 6 is progressively smaller toward closed end 105 ($\theta 1' < \theta 2' < \theta 3'$), and the angle of incidence of the ray of emitted light on curved surface in region II of paraboloid 101a shown in FIG. 6 is progressively greater toward open end 106 ($\theta 3' < \theta 4' < \theta 5'$). The angles of incidence of the rays "g" through "k" on reflecting mirror 4 of the light source device according to the present invention and those on paraboloid 101a are related as follows: $\theta 1 < \theta 1'$, $\theta 2 < \theta 2'$, $\theta 3 = \theta 3'$, $\theta 4 > \theta 4'$, and $\theta 5 > \theta 5'$. It can be seen from the relationship that the magnitude of a change ($\theta 3 - \theta 1$) of the angle of incidence of the ray of emitted light on the curved surface 4a in region I of reflecting mirror 4 of the light source device according to the present invention is greater than the magnitude of a change ($\theta 3' - \theta 1'$) of the angle of incidence of the ray of emitted light on the curved surface in region I of paraboloid 101a, and the magnitude of a change ($\theta 5 - \theta 3$) of the angle of incidence of the ray of emitted light on the curved surface 4b in region II of reflecting mirror 4 of the light source device according to the present invention is greater than the magnitude of a change ($\theta 5' - \theta 3'$) of the angle of incidence of the ray of emitted light on the curved surface in region II of paraboloid 101a.

Figure 1:
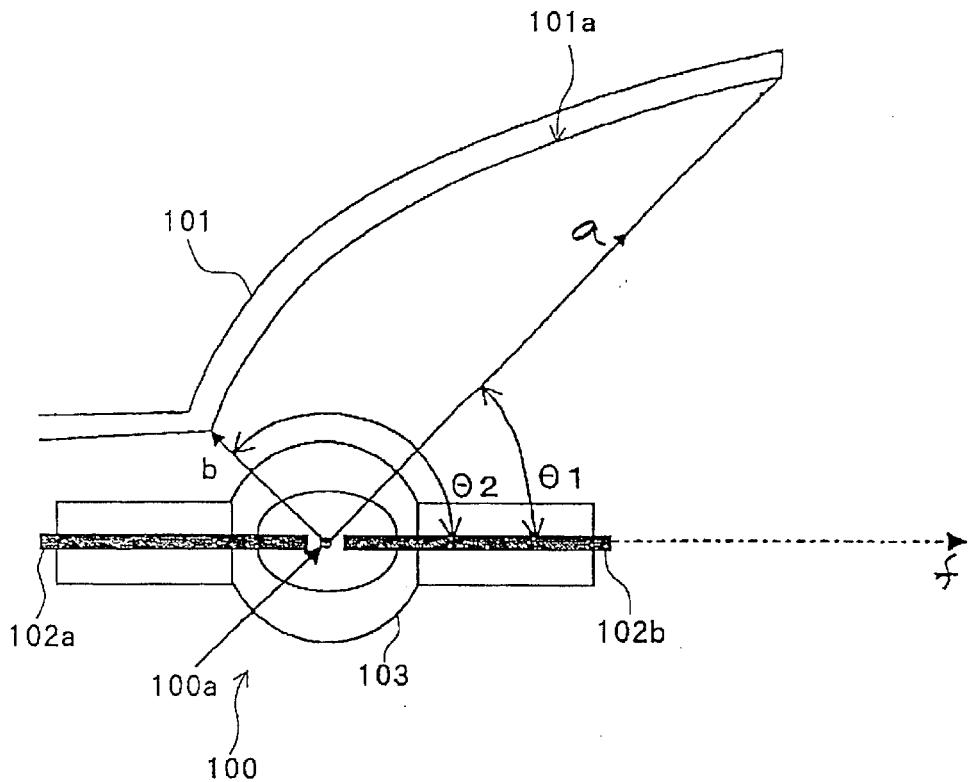
FIG. 1 is a fragmentary cross-sectional view of a conventional light source device.
Figure 2:
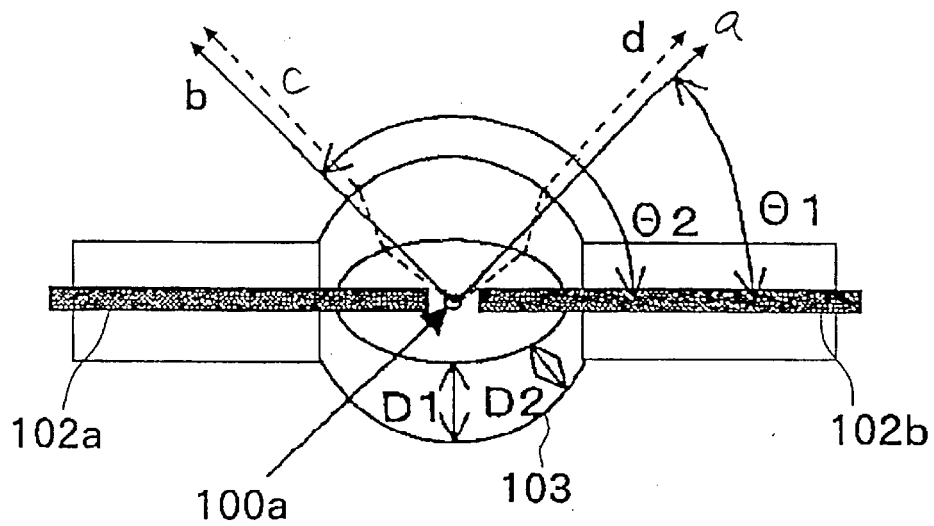
FIG. 2 is a cross-sectional view of a conventional discharge lamp designed to increase the effective ray availability ratio of a light source.
Figure 3:
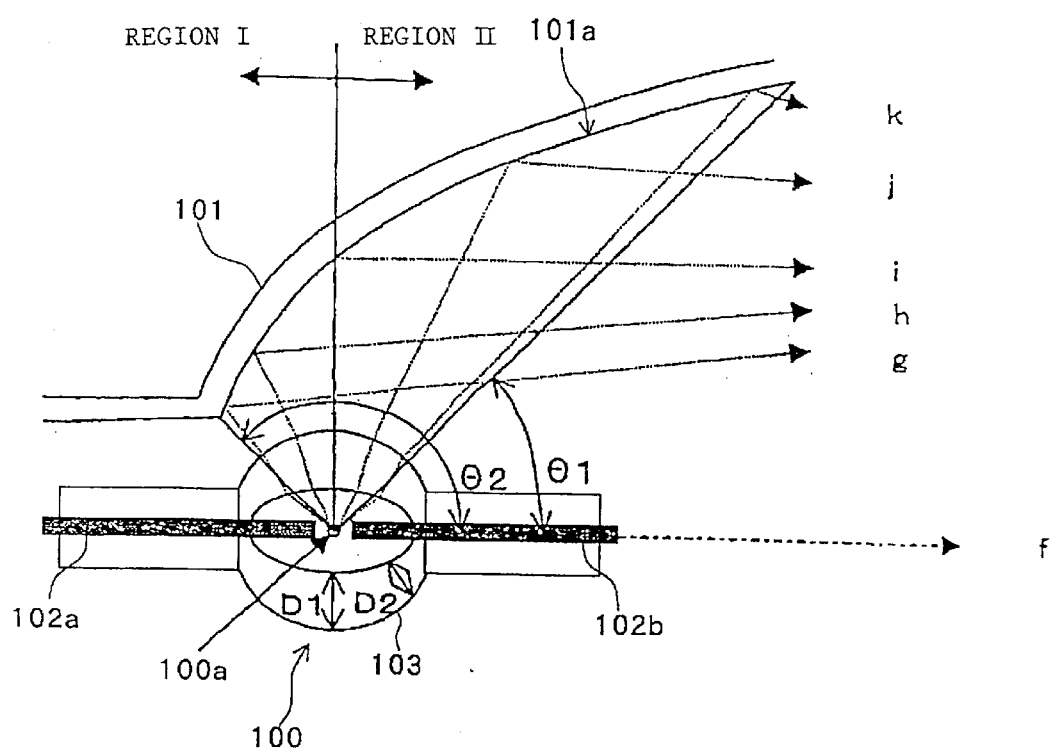
FIG. 3 is a cross-sectional view showing traced rays of light emitted from a light source which has a transparent bulb of the discharge lamp shown in FIG. 2.

With the light source device according to the present invention, rays "g" through "k" radiated from the light emission center 1a of the discharge lamp 1 are reflected by curved surfaces 4a, 4b of reflecting mirror 4 and travel out substantially parallel to optical axis f of reflecting mirror 4. The light source device according to the present invention has a greater effective ray availability ratio than the light source device shown in FIG. 1, and emits rays of light whose parallelism with optical axis f is better than the light source device shown in FIG. 2.

The rays of light radiated from light emission center 1a and reflected by reflecting mirror 4 should preferably be angularly spaced within an angle of 3° or less from optical axis f of reflecting mirror 4. When the rays of emitted light are kept within the above angular range, if the light source device is incorporated in a liquid crystal projector, described later on, then the parallel rays of light emitted from the light source device are not displaced out of the liquid crystal panel of the liquid crystal projector.

The light source device shown in FIG. 4 has different curved surfaces 4a, 4b in respective regions I, II. If the light source device is incorporated in a projection-type display apparatus, for example, then since the optical system of the projection-type display apparatus uses the rays of light reflected from region I primarily for projection, a reflecting surface may be provided by curved surface 4a in region I and a reflecting surface may be provided by a paraboloid in region II whose focal point is located at light emission center 1a.

Specific conditions for curved surface 4a of reflecting mirror 4 will be described below. It is assumed in the description given below that transparent bulb 2 is made of quartz and has a spherical outer wall surface and an elliptical inner wall surface.

Figure 7:
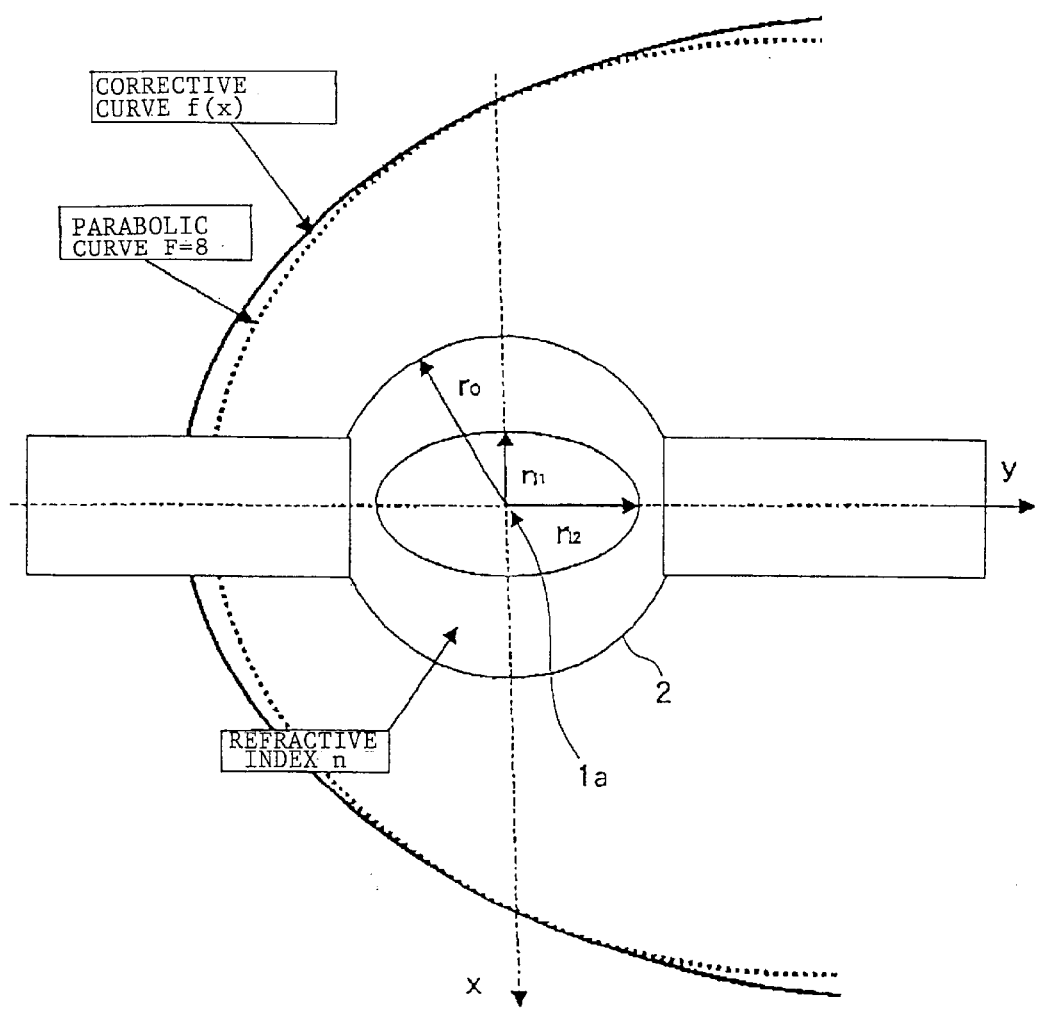
FIG. 7 is a schematic view illustrative of specific conditions for the curved surface of the reflecting mirror of the light source device shown in FIG. 4.

As shown in FIG. 7, there is established a two-dimensional plane having an origin at light emission center 1a, horizontal axis y extending along the optical axis of reflecting mirror 4, i.e., the axis of revolution of the paraboloid whose focal point is located at light emission center 1a, and vertical axis x perpendicular to horizontal axis y. The parabolic curve of the paraboloid whose focal point is located at light emission center 1a is expressed by:

$$y = (1/4F)x^2 - F \qquad (1)$$

and a corrective curve f(x) corresponding to curved surface 4a in region I is expressed by:

$$f(x) = (1/4F)x^2 - F + \alpha(x - 2F)^2 \qquad (2)$$

where F represents the F value of the parabolic curve, i.e., the reciprocal of an aperture ratio in case the paraboloid whose focal point is located at light emission center 1a is used as a reflecting surface, F being in the range from 6 to 9, and α represents a corrective value of the corrective curve. In the equation (2), the term $\alpha(x - 2F)^2$ is a corrective term.

Figure 8:
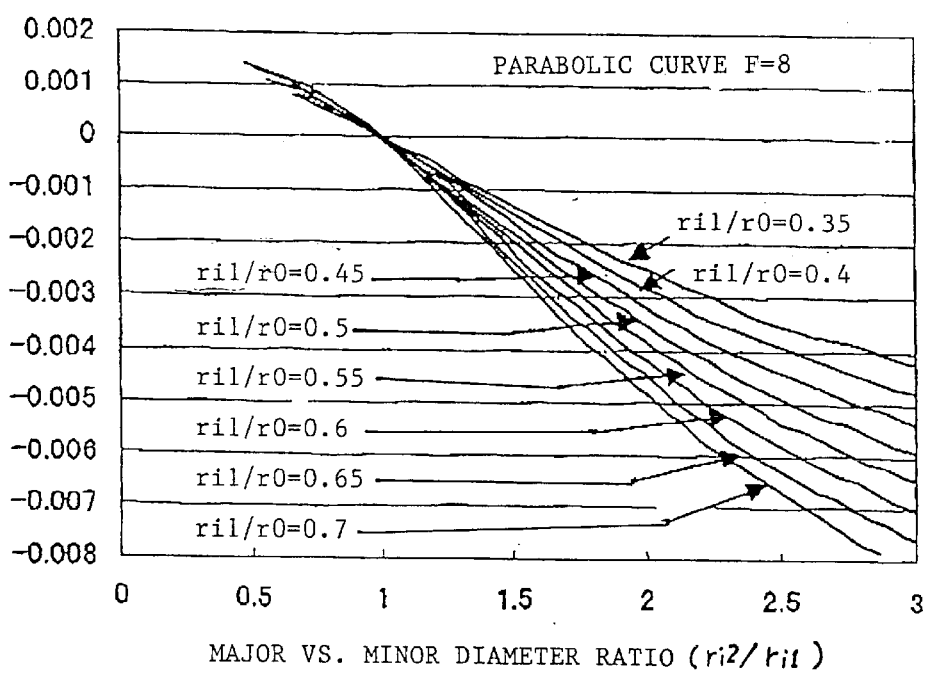
FIG. 8 is a diagram showing the relationship between major vs. minor diameter ratios ($r_{i2}/r_{i1}$) of the inner wall surface of the bulb of the light source device shown in FIG. 4 and corrective values $\alpha$.

A process of determining an optimum value for corrective value α for making the rays of emitted light parallel to the optical axis will be described below. Corrective value α is optimized by changing the parameters of outside diameter (spherical shape) $r_0$ of transparent bulb 2, minor inside diameter (elliptical shape) $r_{i1}$ of transparent bulb 2, and major inside diameter (elliptical shape) $r_{i2}$ of transparent bulb 2. First, corrective value α is determined for high ray parallelism by fixing outside diameter $r_0$ and using the major vs. minor diameter ratio ($r_{i2}/r_{i1}$) of the inner wall surface of transparent bulb 2 as a parameter. FIG. 8 shows the relationship between major vs. minor diameter ratios ($r_{i2}/r_{i1}$) of the inner wall surface of transparent bulb 2 and corrective values α. The ratios and values are shown when the wall thickness ratio ($r_{i1}/r_0$) of transparent bulb 2 is varied in the range from 0.35 to 0.70. It can be seen from FIG. 8 that corrective value α is linear with respect to the major vs. minor diameter ratio ($r_{i2}/r_{i1}$) of the inner wall surface of transparent bulb 2 if corrective value α is 2 or smaller, but changes depending on the wall thickness ratio ($r_{i1}/r_0$) of transparent bulb 2. Therefore, corrective value α is given by the following equation:

$$\alpha = \beta \times (r_{i2}/r_{i1} - 1) \quad (3)$$

where β represents a linear coefficient for determining corrective value α.

Figure 9:
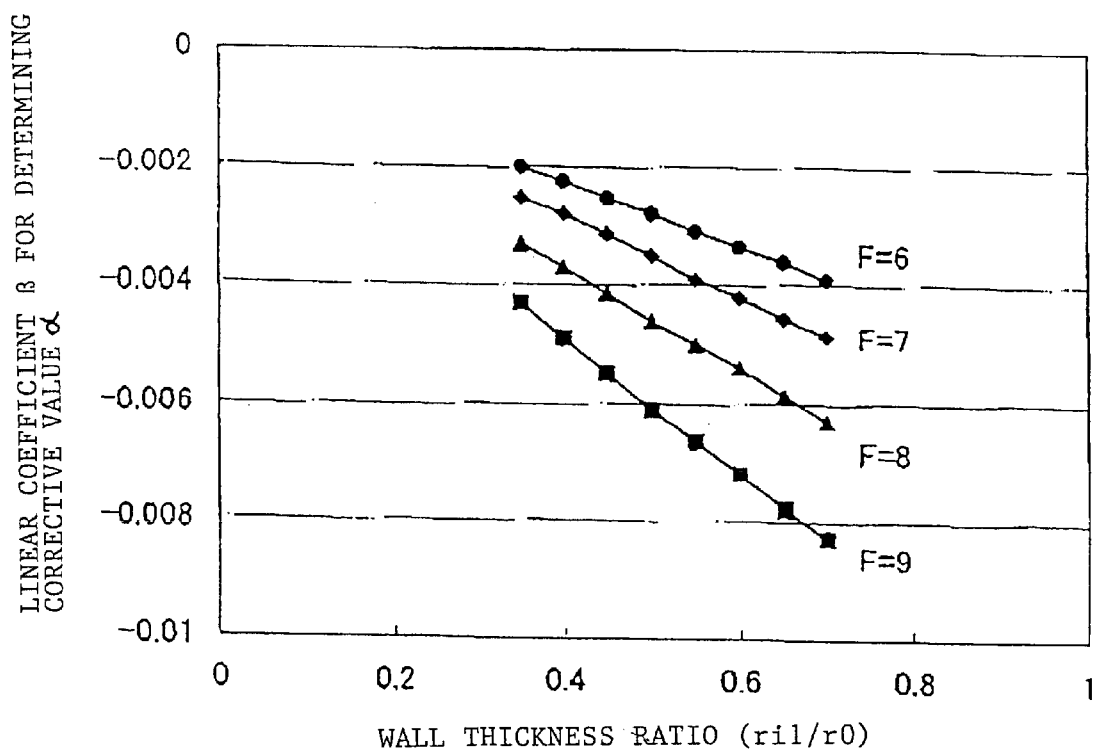
FIG. 9 is a diagram showing the relationship between wall thickness ratios ($r_{i1}/r_0$) of the bulb of the light source device shown in FIG. 4 and linear coefficients $\beta$ for determining corrective values $\alpha$.

FIG. 9 shows the relationship between wall thickness ratios ($r_{i1}/r_0$) of transparent bulb 2 and linear coefficients β for determining corrective values α. The wall thickness ratios and the linear coefficients are shown when the F value of the parabolic curve is varied in the range from 6 to 9. It can be seen from FIG. 9 that linear coefficient β for determining corrective value α is linear with respect to the wall thickness ratio ($r_{i1}/r_0$) of transparent bulb 2, by changes depending on the F value. Therefore, linear coefficient β is given by the following equation:

$$\beta = \gamma \times (r_{i1}/r_0) \quad (4)$$

where γ represents a linear coefficient for determining linear coefficient β.

Figures 10, 11:
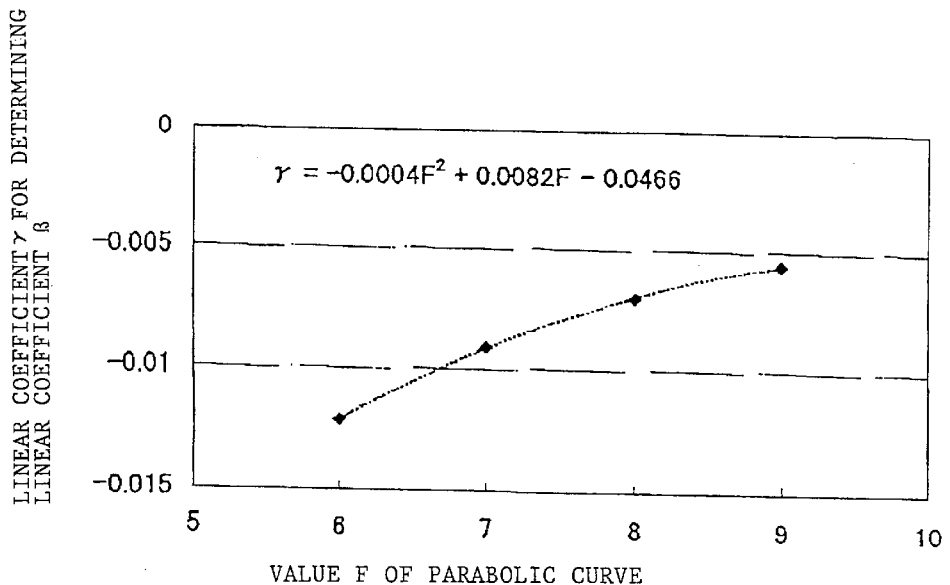
FIG. 10 is a diagram showing the relationship between the F values of parabolic curves and linear coefficient $\gamma$ for determining corrective values $\beta$ for the light source device shown in FIG. 4.
FIG. 11 is a table showing a list of materials for the transparent bulb that are applicable to the light source device according to the present invention.

FIG. 10 shows the relationship between the F values of parabolic curves and linear coefficients γ for determining linear coefficient β. It can be seen from FIG. 10 that linear coefficient γ is approximated with respect to the F value of the parabolic curve by a quadratic curve. Therefore, linear coefficient γ is given by the following equation:

$$\gamma = -0.0004F^2 + 0.0082F - 0.0466 \quad (5)$$

From the above equations (3) through (5), the following equation is obtained:

$$\alpha = \gamma \times (r_{i1}/r_0) \times (r_{i2}/r_{i1} - 1) \quad (6)$$

where $\gamma = -0.0004F^2 + 0.0082F - 0.0466$.

As described above, corrective value α of the corrective curve for the reflecting surface provided by curved surface 4a of reflecting mirror 4 for producing parallel rays of light is determined from the shape of the bulb and the F value of the parabolic curve according to the equation (6). The equation (6) is established when the conditions according to the following equations (7) through (10) are satisfied:

$$0.35 < (r_{i1}/r_0) < 0.7 \quad (7)$$

$$1 < (r_{i2}/r_{i1}) < 2 \quad (8)$$

$$6 < F < 9 \quad (9)$$

$$n = 1.46 \quad (10)$$

where n represents the refractive index of the transparent bulb.

In the above embodiment, the transparent bulb is made of quartz. However, the transparent bulb may be made of any of various materials. FIG. 11 shows a list of materials for the transparent bulb that are applicable to the light source device according to the present invention. As shown in FIG. 11, the materials include light-transmissive alumina and YAG.

As described above, the light source device according to the present invention has an increased effective ray availability ratio because of the transparent bulb of lens structure, and produces rays of light reflected by the reflecting mirror which are substantially parallel to the optical axis. The light source device according to the present invention is of high luminance and emits rays of light with excellent parallelism with the optical axis.

Illuminating Apparatus

The light source device according to the present invention may be incorporated in an illuminating apparatus for producing uniform illuminating light of high luminance. The illuminating apparatus will be described below.

Figure 12:
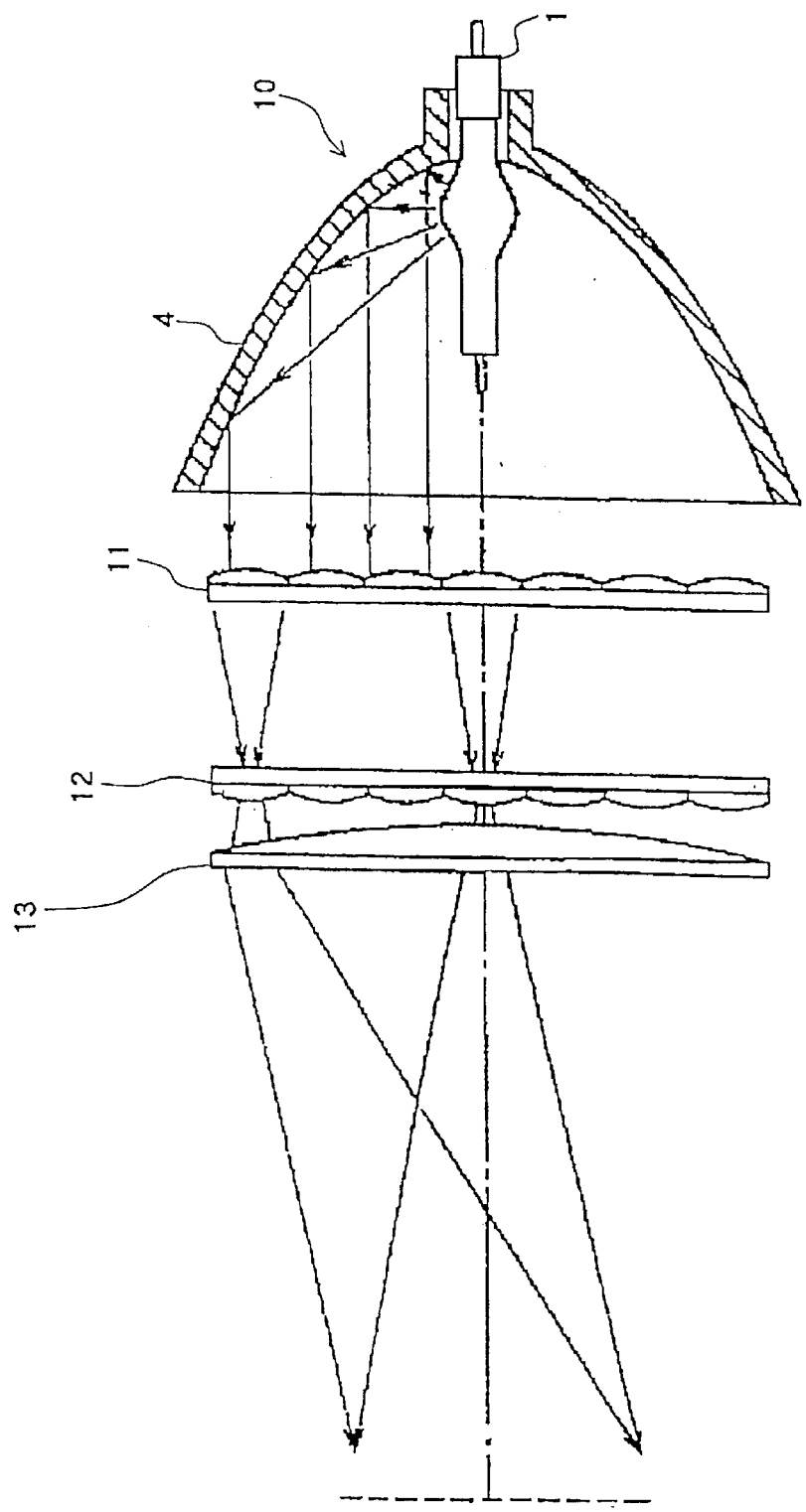
FIG. 12 is a cross-sectional view of an illuminating apparatus which incorporates the light source device shown in FIG. 4.

The illuminating apparatus primarily comprises the light source device shown in FIG. 4 and a condensing optical system for converging rays of light emitted from the light source device to produce uniform illuminating light. The condensing optical system may comprise a condensing lens, a combination of lens arrays, or any of various lenses. FIG. 12 shows the illuminating apparatus by way of example.

As shown in FIG. 12, the illuminating apparatus comprises light source device 10 which is of the structure shown in FIG. 4 and a condensing optical system having a pair of lens arrays 11, 12 and auxiliary lens 13. Each of the lens arrays 11, 12 comprises a plurality of lenses arranged in a two-dimensional pattern on a flat plate. Lens arrays 11, 12 are disposed in confronting relation to each other with their lenses having flat sides facing each other. The lenses in the two-dimensional pattern of lens arrays 11, 12 are positioned in one-to-one correspondence.

Rays of light emitted from discharge lamp 1 are reflected by reflecting mirror 4 and travel out parallel to the optical axis of reflecting mirror 4. The rays of light from light source device 10 are divided into a plurality of partial rays by lens arrays 11, 12, and the divided partial rays are converged in a superposed fashion onto a flat surface by auxiliary lens 13. The superposed partial rays provide uniform illuminating light of high luminance.

The illuminating apparatus according to the present invention is of high luminance and is capable of emitting rays of light in high parallelism.

Projection-type display apparatus:

The light source device according to the present invention may be incorporated in a projection-type display apparatus of high luminance. The projection-type display apparatus will be described below.

Figure 13:
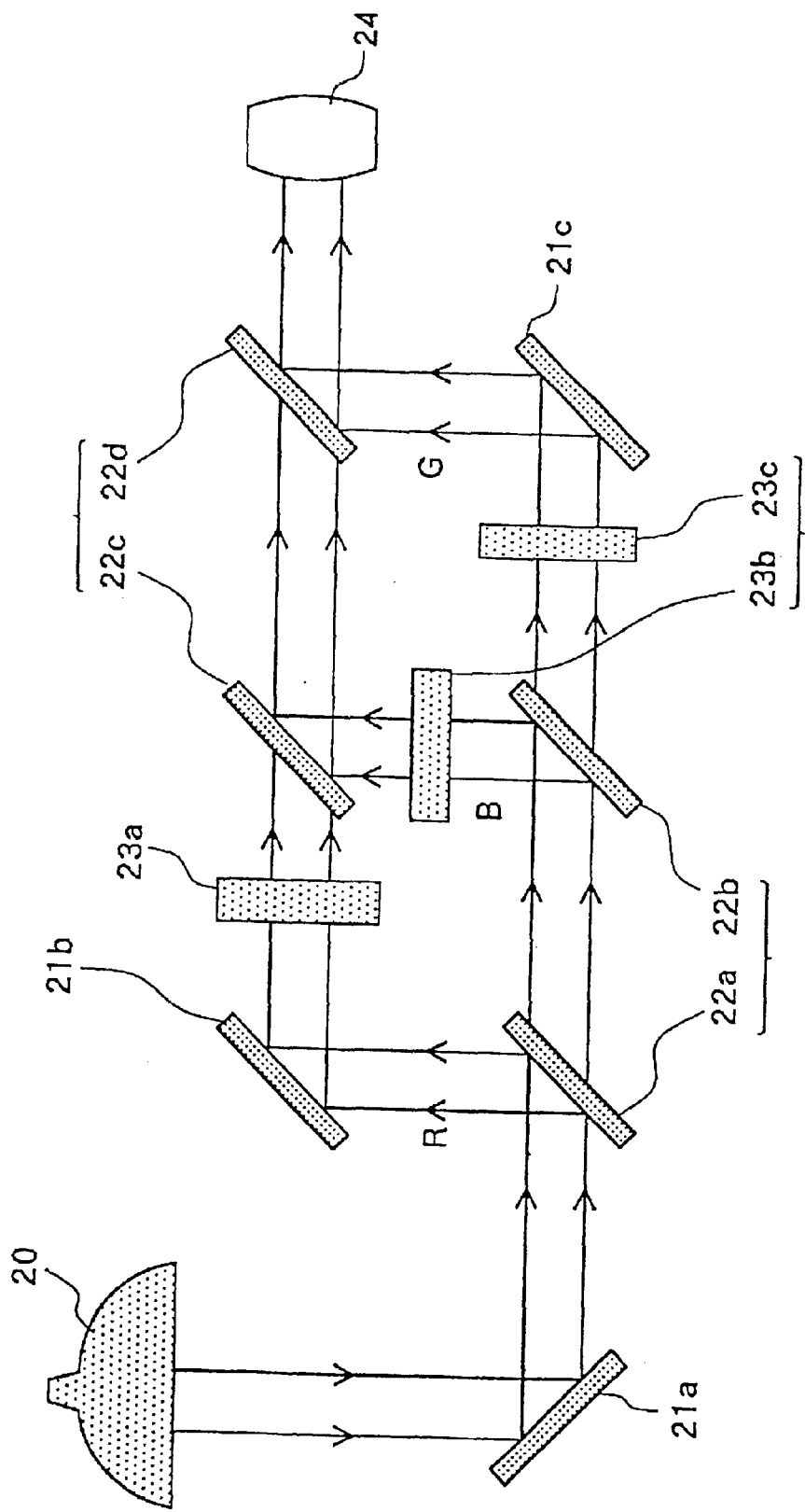
FIG. 13 is a cross-sectional view of three-panel liquid crystal projector which incorporates the light source device shown in FIG. 4.

The projection-type display apparatus primarily comprises the light source device shown in FIG. 4 and a projection image generator for partly passing light emitted from the light source device to generate a projection image. The light source device may incorporate the structure of the illuminating apparatus described above. The projection image generator comprises a liquid crystal panel or a light valve, which is of a known nature, for partly passing light emitted from the light source device, and a projection optical system for projecting, at an enlarged scale, an image having passed through liquid crystal panel or the light valve. FIG. 13 shows a three-panel liquid crystal projector as an example of the projection-type display apparatus.

As shown in FIG. 13, the three-panel liquid crystal projector comprises light source device 20, total reflection mirrors 21a through 21c, dichroic mirrors 22a through 22d, liquid crystal panels 23a through 23c, and projection lens 24.

Light source device 20 is the same as the light source device shown in FIG. 4. Dichroic mirror 22a reflects red light (R) of which light emitted from light source device 20 and passes remaining blue light (B) and green light (G) thereof. Dichroic mirror 22b reflects blue light (B) having passed through dichroic mirror 22a and passes remaining green light (G). Red light (R), blue light (B), and green light (G) separated by dichroic mirrors 22a, 22b are applied to respective liquid crystal panels 23a through 23c.

Liquid crystal panels 23a through 23c are controlled by a control circuit (not shown). Dichroic mirror 22c combines image light (R) modulated by liquid crystal panel 23a and image light (B) modulated by liquid crystal panel 23b. Dichroic mirror 22d combines image light (G) modulated by liquid crystal panel 23c and image lights (R, B) combined by dichroic mirror 22c.

With the three-panel liquid crystal projector, image light (R) produced when red light (R) reflected by dichroic mirror 22a passes through liquid crystal panel 23a, image light (B) produced when blue light (B) reflected by dichroic mirror 22b passes through liquid crystal panel 23b, and image light (G) produced when green light (G) passing through dichroic mirror 22b passes through liquid crystal panel 23c are optically combined by dichroic mirrors 22c, 22d, and the combined light images are projected, at an enlarged scale, onto a given screen by projection lens 24 to generate a projected image thereon.

In this embodiment, the light source device shown in FIG. 4 is used as the light source of the three-panel liquid crystal projector. However, the light source device shown in FIG. 4 may be used as the light source of a single-panel liquid crystal projector.

The projection-type display apparatus is capable of projecting high-quality images of high luminance as they are free of image quality degradations which have heretofore been produced due to poor ray parallelism.

While preferred embodiments of the present invention have been described using specific terms, such description is for illustrative purposes only, and it is to be understood that changes and variations may be made without departing from the spirit or scope of the following claims.

What is claimed is:

1. A light source device comprising:
  a discharge lamp having a tubular transparent bulb with sealed opposite ends for generating discharged light emission near a light emission center thereof; and
  a reflecting mirror having a reflecting surface which comprises a curved surface approximating but differing from a paraboloid;
  said transparent bulb having a lens structure whose wall thickness is greater at the light emission center thereof than at the sealed ends thereof;
  said reflecting surface being divided by a boundary where a ray of light emitted from said light emission center and passing, unrefracted, through said transparent bulb is applied to the reflecting surface, into a first curved surface extending from said boundary toward a closed end of said reflecting mirror and a second curved surface extending from said boundary toward an open end of said reflecting mirror, which is remote from said closed end, said second curved surface being a paraboloid whose focal point is positioned at the light emission center of said transparent bulb,
  said first curved surface being shaped such that the angle of incidence of a ray of light emitted from said light emission center and applied to said first curved surface is progressively smaller toward said closed end, and changes of said angle of incidence are greater than changes of the angle of incidence of a ray of light on said paraboloid.

2. A light source device according to claim 1, wherein said first curved surface is arranged such that rays of light emitted from said light emission center and reflected by said first curved surface travel parallel to the axis of said paraboloid.

3. A light source device according to claim 1, wherein said second curved surface is arranged such that the angle of incidence of a ray of light emitted from said light emission center and applied to said second curved surface is progressively greater toward said open end.

4. A light source device according to claim 3, wherein said reflecting mirror is arranged such that rays of light emitted from said light emission center and reflected by said first and second curved surfaces travel parallel to the axis of said paraboloid.

5. A light source device according to claim 1, wherein said transparent bulb has outer and inner wall surfaces which are either spherical or elliptical.

6. A light source device according to claim 5, wherein said transparent bulb is made of quartz and has a spherical outer wall surface and an elliptical inner wall surface, there being established a two-dimensional plane having an origin at said light emission center of the transparent bulb, a horizontal axis y extending along the axis of the paraboloid, and a vertical axis x perpendicular to the horizontal axis y, and wherein the parabolic curve of said paraboloid is expressed by:

$$y=(1/4F)x^2-F$$

a corrective curve f(x) corresponding to said first curved surface is expressed by:

$$f(x)=(1/4F)x^2-F+\alpha(x-2F)^2$$

where F represents the reciprocal of an aperture ratio in case the paraboloid is used as a reflecting surface, and an optimum value for a corrective value $\alpha$ for said corrective curve is given by:

$$\alpha=\gamma x(r_{i1}/r_0)x(r_{i2}/r_{i1}-1)$$

in so far as the following conditions are satisfied:

$$0.35<(R_{i1}/r_0)<0.7$$

$$1<(r_{i2}/r_{i1})<2$$

$$6<F<9$$

where $\gamma$ represents a linear coefficient for determining said corrective value $\alpha$, and $r_0$, $r_{i1}$ and $r_{i2}$ represent an outside diameter, a minor inside diameter and a major inside diameter which are of said transparent bulb.

7. An illuminating apparatus comprising:
  a light source device according to claim 6; and
  a condensing optical system for converging rays of light emitted from said light source device to produce uniform illuminating light.

8. A projection-type display apparatus comprising:
  a light source device according to claim 6; and
  projection image generating means for partly passing light emitted from said light source device to generate a projection image.

9. An illuminating apparatus comprising:
  a light source device according to claim 1; and
  a condensing optical system for converging rays of light emitted from said light source device to produce uniform illuminating light.

10. A projection-type display apparatus comprising:
  a light source device according to claim 1; and
  projection image generating means for partly passing light emitted from said light source device to generate a projection image.

* * * * *